United States Patent [19]

Karoly et al.

[11] 4,166,042
[45] Aug. 28, 1979

[54] COMPOSITIONS FOR PREPARING ELASTOMERIC URETHANE/UREA BLOCK COPOLYMERS

[75] Inventors: Gabriel Karoly, Springfield; Vincent J. Gajewski, Jackson, both of N.J.

[73] Assignee: M & T Chemicals Inc., Stamford, Conn.

[21] Appl. No.: 912,228

[22] Filed: Jun. 5, 1978

[51] Int. Cl.$^2$ .............................................. C08G 18/32
[52] U.S. Cl. ....................................... 252/182; 528/60
[58] Field of Search ........................... 528/60; 252/182

[56] References Cited

U.S. PATENT DOCUMENTS

| | | | |
|---|---|---|---|
| 3,817,940 | 6/1974 | Blahak et al. | 528/60 |
| 3,920,617 | 11/1975 | Hirosawa et al. | 260/578 |
| 3,940,371 | 2/1976 | Case | 528/60 |

Primary Examiner—Maurice J. Welsh
Attorney, Agent, or Firm—Robert Spector; Kenneth G. Wheeless

[57] ABSTRACT

The curing time for articles prepared by reacting an isocyanate-terminated prepolymer with an aromatic diamine to form an elastomeric urethane/urea copolymer is significantly decreased using a tris(2,4,6-aminophenylthiomethyl)1,3,5-trihydrocarbyl substituted benzene as the crosslinking agent.

6 Claims, No Drawings

COMPOSITIONS FOR PREPARING ELASTOMERIC URETHANE/UREA BLOCK COPOLYMERS

BACKGROUND OF THE INVENTION

This invention relates to the preparation of elastomeric, urethane/urea copolymers. More particularly, this invention relates to novel compositions for preparing elastomeric urethane/urea copolymers wherein the reagents employed to prepare the copolymers include a difunctional amine as the chain extender and a trifunctional amine as a crosslinking agent.

Elastomeric urethane/urea copolymers are conventionally prepared by reacting an isocyanate-terminated prepolymer (obtained by reacting a polyol having a functionality of about two and a stoichiometric excess of a diisocyanate compound) with a difunctional amine as the chain extending agent, optionally in the presence of a suitable catalyst to obtain final elastomer. The elastomer is believed to be a block copolymer containing both urethane and urea groups.

Up until recently the preferred chain extender was 4,4'-methylene-bis(2-chloroaniline), which is referred to in the trade as "MOCA." MOCA imparts excellent mechanical strength properties to urethane elastomers, however, the use of this diamine has been severely restricted since regulations appeared in the Federal Register, Vol. 38, No. 144, July 27, 1973. These regulations require that strict precautions be exercised during the manufacture, handling and use of MOCA. These restrictions have encouraged a search for other chain extending agents which impart the same level of desirable physical properties as MOCA.

U.S. Pat. No. 3,920,617 teaches that sulfur-containing diamines of the general formula

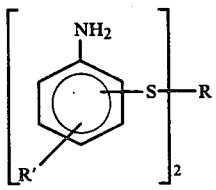

wherein R is alkylene and R' is hydrogen, halogen or a hydro-carbon group are useful chain extending agents for urethane type elastomers. The rate at which this class of compounds reacts with prepolymers terminated using 2,4- and 2,6-tolylene diisocyanates to form a molded article that retains its shape and structural integrity is considerably slower than the rate achieved using other prior art amine-type curing catalysts such as MOCA. A slower reaction is a considerable disadvantage in a commercial molding operation, since it would increase the time required for the material to become sufficiently cured that it can be removed from the mold. A mixture of isocyanate-terminated prepolymer and diamine curing agent is usually a liquid of from moderate to high viscosity. The viscosity gradually increases as these two materials react. This liquid is poured into a heated mold wherein the liquid cures to form a solid material. The time interval between filling of the mold and the earliest time at which the molded object will retain its shape when removed from the mold is known as the "demold time." It is highly desirable to achieve the shortest possible demold time, since this will permit an increase in production rate with a corresponding decrease in production costs. The rate at which the isocyanate reacts with the prepolymer to form a non-flowing material should be slow enough at allow the reaction mixture to fill all of the mold cavities.

It is an objective of this invention to decrease the time interval required to convert prepolymers derived from a difunctional isocyanate and a polyol to a non-deformable and demoldable state using any of the sulfur-containing diamine-type chain extending agents disclosed in the aforementioned U.S. Pat. No. 3,920,617. It has now been found that this objective can be achieved using certain trifunctional amines as crosslinking agents in conjunction with these sulfur-containing aromatic diamines.

SUMMARY OF THE INVENTION

This invention provides a novel composition for preparing elastomeric urethane/urea copolymers, said composition comprising (1) an oligomeric product of a difunctional alkylene polyol with a stoichiometric excess of an aromatic diisocyanate such that the terminal groups of said reaction product are isocyanate groups, (2) a chain extending agent selected from the group consisting of aromatic diamines wherein each amine group is bonded to a carbon atom of an aromatic carbocyclic ring, and (3) a crosslinking agent of the general formula

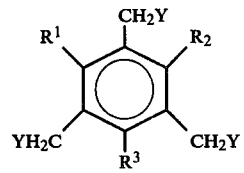

wherein $R^1$, $R^2$ and $R^3$ are each alkyl containing 1 to 3 carbon atoms and Y is

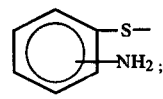

$R^1$, $R^2$ and $R^3$ are individually selected from the group consisting of alkyl groups containing from 1 to 3 atoms.

The present crosslinking agents are novel compounds.

DETAILED DESCRIPTION OF THE INVENTION

The novel crosslinking agents employed in the present compositions can be prepared by chloromethylation of substituted trialkylbenzenes such as mesitylene. This intermediate product is then reacted with an alkali metal salt of an aminothiophenol to yield a compound of the general formula

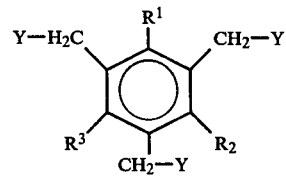

wherein $R^1$, $R^2$, $R^3$ and Y are as previously defined. Preferably $R^1$, $R^2$ and $R^3$ are methyl.

It is well known that chloromethylation of an aromatic hydrocarbon or a suitable derivative thereof, such as a phenol, can be achieved using formaldehyde with at least an equimolar amount of hydrogen chloride. Preparation of the present crosslinking agents requires at least three moles of formaldehyde and hydrogen chloride for each mole of mesitylene or other substituted trialkylbenzene.

The crosslinking agents of this invention are particularly useful for preparing elastomeric urethane/urea block copolymers using the so-called "2-package" method whereby a mixture containing the desired amine chain extender, also referred to as a curing agent, and catalyst, is combined with an isocyanate-terminate prepolymer derived from a polyfunctional isocyanate such as one or more of the isomeric tolylene diisocyanates and a polyol.

Among the classes of hydroxyl-terminated polyalkylene polyols that can be included in the present compositions are (1) the polyalkylene ether polyols formed by the polymerization of alkylene oxides such as ethylene and propylene oxides and (2) oligomeric glycols derived from the polymerization of heterocyclic ethers such as tetrahydrofuran. Methods for preparing these polyols are well known in the art. A preferred class of polyether polyols is represented by the general formula $HO(RO)_xH$ wherein R is alkylene containing two or more carbons and x is an integer. The degree of polymerization, represented by x, is an average that is preferably equivalent to an average molecular weight from about 500 to 4,000. Polyols having a higher or lower molecular weight may be useful for certain applications.

Polyester polyols derived from the reaction of a glycol or oligomeric diol such as polypropylene glycol with an aliphatic dicarboxylic acid can also be employed in the present compositions. Suitable acids include adipic, succinic and sebacic acids. Alternatively, polyester polyols can be prepared by the polymerization of lactones such as ε-caprolactone.

As previously disclosed, the prepolymers employed to prepare elastomeric urethane/urea copolymers contain unreacted isocyanate groups. The concentration of these unreacted isocyanate groups is from 3 to about 10%, based on the weight of the prepolymer.

The rate of the reaction between the isocyanate-terminated prepolymer and the preferred sulfur-containing aromatic diamines to form a self-supporting material is relatively slow compared to the rate of reaction using other amine chain extending agents such as MOCA, and the demold times are much longer than demold times for compositions containing prior art diamine type curing agents. The present crosslinking agents significantly decrease the demold time of compositions containing the present sulfur-containing aromatic diamines to the extent that the demold times are equivalent to those that can be achieved using MOCA.

The amount of crosslinking agent required to achieve a desired demold time is dependent upon a number of factors, including the type of prepolymer, the ratio of isocyanate groups to amine groups present in the prepolymer and the mold temperature. For most applications the concentration of crosslinking agent is from 1 to 25%, based on the total moles of diamine and crosslinking agent present in the composition, and the total number of amine groups present is from 80 to 95%, of the stoichiometric amount required to react with all of the isocyanate groups of the prepolymer.

The following examples disclose preferred embodiments of the present compositions and should not be interpreted as limiting the scope of the accompanying claims. All parts and percentages are by weight unless otherwise specified.

EXAMPLE 1

Preparation of 2,4,6-tris(o-aminophenylthiomethyl)mesitylene

A 2-liter glass reaction vessel equipped with a Teflon® stirrer, reflux condenser, addition funnel, 2 thermometers and an electrical heater was charged with 243 g water and 104.2 g sodium hydroxide pellets. After boiling under a nitrogen atmosphere for 5 minutes, 167.8 g benzothiazole were added to the contents of the reactor over 50 minutes. The resultant mixture was then heated to the boiling point for 2 hours. A solution of 0.5 g tetrabutyl phosphonium chloride (50% in toluene) and 50 g toluene were then added, which cooled the reaction mixture to 90° C. A solution of 100 g 2,4,6-tris (chloromethyl)mesitylene in 300 g of warm toluene was added over a 15 minute period and the resultant mixture was heated at the boiling point for 2 hours. The aqueous phase of the reaction mixture was then discarded and the organic phase washed with 100 g hot water. The residual water was removed by azeotropic distillation. After being filtered the toluene solution gradually cooled to room temperature, during which time a slightly off-white solid crystallized. The solid was filtered off, washed sequentially with cold toluene and heptane and then dried under reduced pressure at 90° C. The product weighed 164.7 g, melted from 161° to 166° C. and exhibited an amine equivalent of 181. The theoretical amine equivalent for the expected product, 1,3,5-tris(o-aminophenylthiomethyl)mesitylene, is 178.

EXAMPLE 2 (Control)

An elastomeric urethane/urea copolymer was prepared using a tolylene diisocyanate-terminated polytetramethylene ether glycol prepolymer that exhibited a molecular weight of 1000. The prepolymer was cured at 84° C. using 1,2-bis(2-aminophenylthio)ethane in an amount equivalent to 85% of stoichiometry, based on the number of isocyanate groups present. Prior to being combined with the diamine the prepolymer was degassed by heating it to 85° C. while maintaining the prepolymer under reduced pressure. The diamine together with the catalyst was heated to 85° C., at which time it was added to the degassed prepolymer. The time at which these reagents were combined was used as the zero reference point. The resultant mixture was stirred for 40 seconds and then degassed for 1.3 minutes at 85° C. under reduced pressure, after which it was poured into a mold containing six L-shaped cavities wherein each "leg" of the cavity was 2 inches (5 cm) long, 1 inch (2.5 cm) wide and 0.05 inch (1.8 cm) deep. The mold was then placed on the lower platen of a hydraulic press that was heated to 85° C. The surface of the liquid was periodically probed with a metal spatula until it had solidified to the extent that the spatula would not penetrate the surface using moderate pressure. A cover was then placed on the mold and it was subjected to a pressure of 35,000 pounds (1590 kg) using a 5 inch (12.7 cm) diameter ram. The small amount of polymer which overflowed when the press was closed was probed periodically with a spatula. When the polymer was no longer "tacky," i.e., it did not stick to the spatula, the first of the six samples in the mold was removed and tested for fracture resistance by grasping each end of the sample and applying force in a direction perpendicular to each leg of the "L" shaped sample in an attempt to initiate a fracture at the interior angle formed by the junction of the two legs. If a fracture was initiated the mold containing the remaining five samples was closed and replaced in the press. Samples were then removed at various intervals and tested for fracture resistance as described in the preceding sentence. The time interval between combining the reagents and removal of the first sample which could not be fractured using the aforementioned test is referred to as the demold time for that particular prepolymer-amine mixture.

The demold times for the prepolymer-diamine reaction product described in this example and the following five examples are listed in the accompanying Table I.

EXAMPLE 3 (Control)

The prepolymer described in the preceding Example 2 was cured at a temperature of 100° C. using 4,4'-methylene bis(o-chloroaniline) at 95% of the required stoichiometric amount. The demold time of the formulation was determined as described in the preceding Example 2.

EXAMPLES 4–6

The prepolymer of Example 2 was cured at 85° C. using 1,2-bis(2-aminophenylthio)ethane at 85% of the stoichiometric amount (based on isocyanate content) together with 5, 10 or 15 mole % (based on diamine) of 2,4,6-tris(o-aminophenylthiomethyl) mesitylene. The demold times of the samples are recorded in the accompanying Table I.

EXAMPLES 7 and 8 (Controls)

Test samples were prepared using the curing agents and procedure of the preceding Examples 2 and 3. The prepolymer was a reaction product of tolylene diisocyanate and a polytetramethylene ether glycol. The prepolymer contained 6.3 weight % of unreacted isocyanate groups. The molecular weight of the prepolymer was 1000. The demold times of the resultant elastomers and those prepared in accordance with the procedure of Examples 9–11 are recorded in the accompanying Table II. Examples 9–11 employed 5, 10 or 15 mole percent (based on diamine) of the crosslinking agent of Example 1 in addition to the diamine.

EXAMPLES 12 and 13 (Controls)

Test samples were prepared using the curing agents and procedure of the preceding Examples 2 and 3. The prepolymer was a reaction product of tolylene diisocyanate and a hydroxyl-terminated polyethylene glycol adipate. The prepolymer exhibited a molecular weight of 1250 and a free isocyanate content of 5.2%. The demold times of the test samples are recorded in the accompanying Table III.

EXAMPLES 14–16

The prepolymer of Example 12 was cured using a mixture of 1,2-bis(2-aminophenylthio)ethane at 85% stoichiometry (based on isocyanate groups) together with 5, 10 or 15 mole% (based on diamine) of 2,4,6-tris-(o-aminophenylthiomethyl) mesitylene. The demold time of test samples prepared in accordance with the procedure of Example 2 are recorded in the accompanying Table III.

The data in the accompanying tables demonstrate that by using the present crosslinking agents in combination with 1,2-bis(o-aminophenylthio)ethane it is possible to achieve demold times equivalent to those obtained using a conventional prior art curing agent, 4,4'-methylene bis(o-chloroaniline). The present combinations of diamine and crosslinking agent do not require the precautions that must be observed when 4,4'-methylene bis(o-chloroaniline) is employed as the diamine.

The physical properties (hardness, modulus, tensile strength and elongation) of representative test samples described in the preceding examples are reported in the accompanying Table 4. The data in this table demonstrate that (a) the physical properties of elastomeric urethane/urea copolymers prepared using the present diamines and crosslinking agents are equivalent to the properties of copolymers prepared using a commonly employed prior art curing agent and (b) the use of a crosslinking agent does not adversely affect these desirable physical properties of the copolymer.

TABLE I

| Example | Curing Agent | Stoichiometry | 2,4,6-tris(o-aminophenylthiomethyl) mesitylene (mole %) | Demold Time Minutes |
| --- | --- | --- | --- | --- |
| 2 | 1,2 bis(2-aminophenylthio) ethane | 85% | 0 | 47 |
| 3 | 4,4' methylene bis(ortho chloroaniline) | 95% | 0 | 30 |
| 4 | 1,2 bis (2-aminophenylthio ethane) | 85% | 5 | 27 |
| 5 | " | 85% | 10 | 23 |
| 6 | " | 85% | 15 | 18 |

TABLE II

| 7 | 1,2 bis(2-aminophenylthio) ethane | 85% | 0 | 38 |
| --- | --- | --- | --- | --- |
| 8 | 4,4'methylene bis(orthochloroaniline) | 95% | 0 | 20 |
| 9 | 1,2 bis(2 aminophenylthio) ethane | 85% | 5 | 36 |
| 10 | " | 85% | 10 | 25 |
| 11 | " | 85% | 15 | 16 |

TABLE III

| 12 | 1,2 bis (2-aminophenylthio) ethane | 85% | 0 | 60 |
| --- | --- | --- | --- | --- |
| 13 | 4,4'methylene bis (orthochloroaniline) | 95% | 0 | 14 |
| 14 | 1,2 bis (2-aminophenylthio) ethane | 85% | 5 | 37 |
| 15 | " | 85% | 10 | 26 |

TABLE III-continued

| 16 | " | | | | 85% | | 15 | | 15 |
|---|---|---|---|---|---|---|---|---|---|

TABLE IV

PHYSICAL PROPERTIES OF REPRESENTATIVE ELASTOMERS

| Composition of Example | $2^a$ | $3^b$ | 4 | 5 | $7^a$ | $8^b$ | 10 | $12^a$ | $13^b$ | 14 | 15 |
|---|---|---|---|---|---|---|---|---|---|---|---|
| Hardness, Shore A | 91 | 90 | 91 | 91 | 94 | 95 | 93 | 95 | 97 | 95 | 96 |
| 100% Modulus, psi | 900 | 1100 | 1000 | 1050 | 1200 | 1650 | 1150 | 1200 | 1600 | 1150 | 1150 |
| 300% Modulus, psi | 1600 | 2100 | 1700 | 1750 | 2600 | 3250 | 3300 | 2400 | 2500 | 2000 | 2100 |
| Tensile, psi | 4200 | 4400 | 4800 | 4200 | 4900 | 4750 | 5700 | 6400 | 6500 | 6600 | 7650 |
| Elongation, % | 420 | 450 | 450 | 430 | 460 | 370 | 310 | 520 | 480 | 370 | 370 |
| Tear Die "C" | 475 | 500 | 510 | 510 | 575 | 600 | 410 | 680 | 675 | 570 | 580 |
| Tear Split | 70 | 75 | 120 | 100 | 120 | 150 | 92 | — | — | 131 | 147 |

[a] Diamine was 1,2-bis(o-aminophenylthio)ethane, no crosslinking agent.
[b] Diamine was 4,4'-methylene-bis(o-chloroaniline), no crosslinking agent.

What is claimed is:

1. A composition for preparing elastomeric polyurethanes by the reaction of said composition with an isocyanate-terminated oligomeric reaction product of a difunctional alkylene polyol with a stoichiometric excess of an aromatic diisocyanate, said composition comprising (1) a chain extending agent selected from the group consisting of aromatic diamines wherein each amine group is bonded to a carbon atom of an aromatic carbocyclic ring, and (2) a crosslinking agent of the general formula

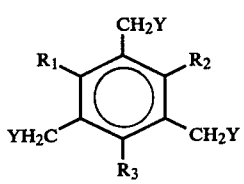

wherein R is alkyl and contains from 1 to 3 carbon atoms and Y is

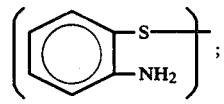

$R^1$, $R^2$ and $R^3$ are individually selected from the group consisting of alkyl groups containing from 1 to 3 carbon atoms.

2. A composition according to claim 1 wherein $R^1$, $R^2$ and $R^3$ are each methyl.

3. A composition according to claim 1 wherein the total number of amine groups present in said composition is from 80 to 95% of the number required to react with all of the isocyanate groups present in said composition.

4. A composition according to claim 1 wherein the concentration of crosslinking agent is from 1 to about 25%, based on the total number of moles of diamine and crosslinking agent present in said composition.

5. A composition according to claim 1 wherein said chain extending agent is of the general formula

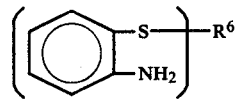

wherein $R^6$ is alkylene and contains from 1 to 8 carbon atoms.

6. A composition according to claim 5 wherein $R^6$ is ethylene.

* * * * *